United States Patent [19]

Babish et al.

[11] E Re. 31,274

[45] Reissued Jun. 14, 1983

[54] ENGINE COOLING SYSTEM FLUSHING APPARATUS AND METHOD

[75] Inventors: John A. Babish, Glendora; Larry K. Arnot, Duarte; Douglas C. Appel, Glendora, all of Calif.

[73] Assignee: Wynn Oil Company, Fullerton, Calif.

[21] Appl. No.: 110,923

[22] Filed: Jan. 10, 1980

Related U.S. Patent Documents

Reissue of:

[64] Patent No.: 4,109,703
Issued: Aug. 29, 1978
Appl. No.: 741,065
Filed: Nov. 11, 1976

[51] Int. Cl.[3] ..... F28G 9/00; F02B 77/04

[52] U.S. Cl. ..... 165/95; 134/98; 134/102; 134/103; 134/169 A; 134/56 R

[58] Field of Search ..... 165/1, 95; 134/102, 134/103, 169 A, 169 R, 95, 98, 166 R, 22 C, 56 R; 123/41.14

[56] References Cited

U.S. PATENT DOCUMENTS

| | | | |
|---|---|---|---|
| 2,029,232 | 1/1936 | Green . | |
| 2,187,413 | 1/1940 | Boezi et al. . | |
| 2,222,516 | 11/1940 | Powell et al. . | |
| 2,632,719 | 3/1953 | Tankersley . | |
| 2,681,657 | 6/1954 | Griffith . | |
| 2,835,234 | 5/1958 | Rasch et al. . | |
| 3,034,521 | 5/1962 | Greenfield . | |
| 3,115,145 | 12/1963 | Monteath . | |
| 3,409,218 | 11/1968 | Moyer . | |
| 4,127,160 | 9/1976 | Joffe | 165/95 X |

*Primary Examiner*—Albert W. Davis
*Attorney, Agent, or Firm*—William W. Haefliger

[57] ABSTRACT

An internal combustion engine cooling system *that includes a liquid coolant radiator, engine coolant passages and a liquid coolant passing heater* is flushed by:

(a) providing a controlled pressurized flow of flushing liquid and entrained gas bubbles, (b) and passing said flow alternately through (i) the radiator in a reverse direction, (ii) the engine coolant passages *and heater* in a reverse direction, (iii) the radiator in a forward direction, (iv) the engine coolant passages *and heater* in a forward direction.

13 Claims, 13 Drawing Figures

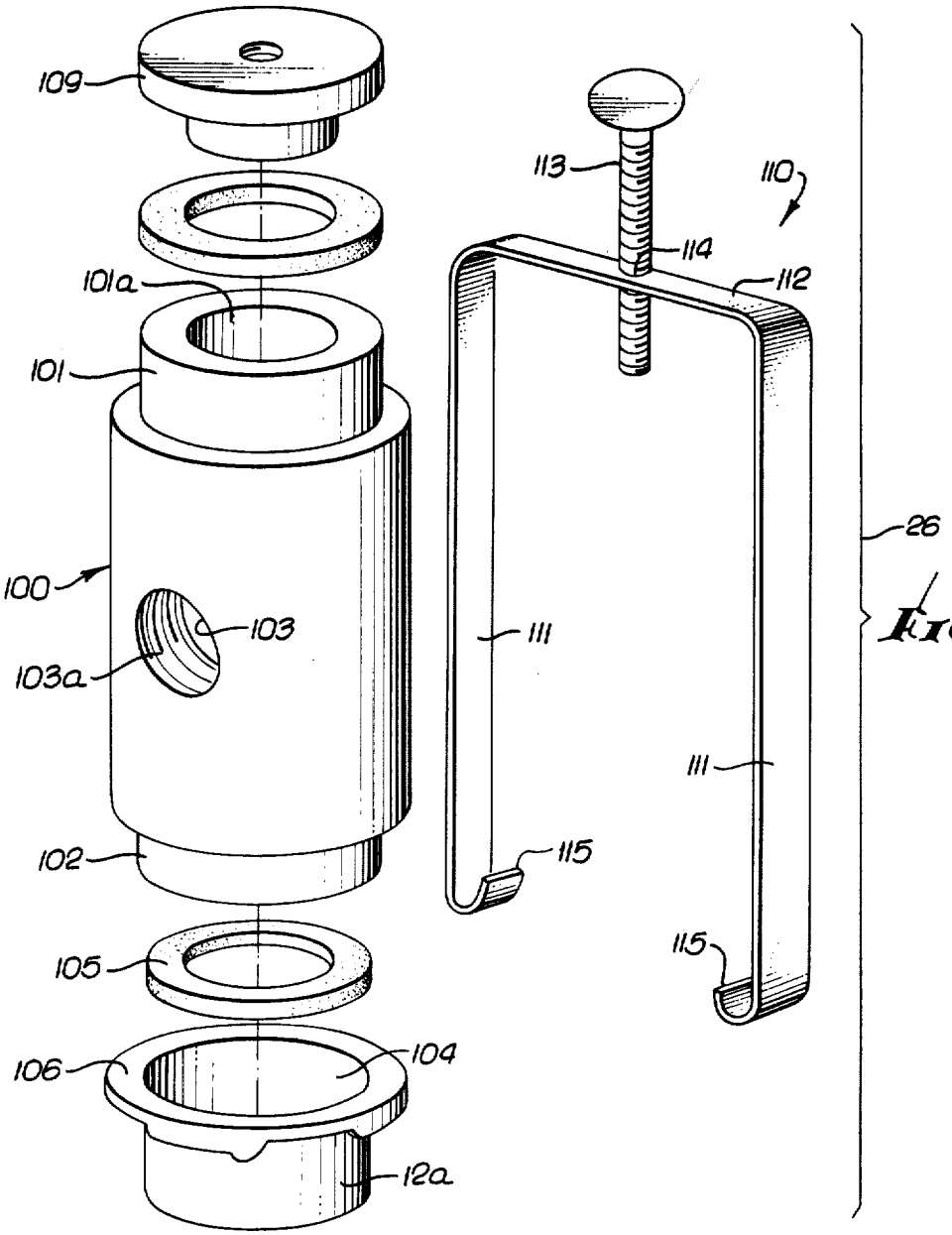
FIG. 9.
FIG. 11.
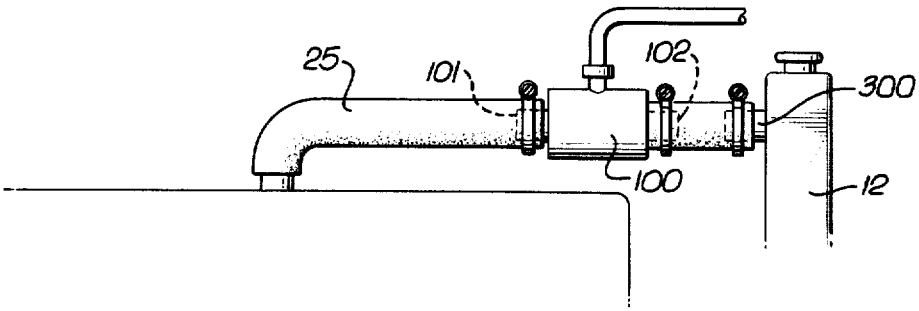

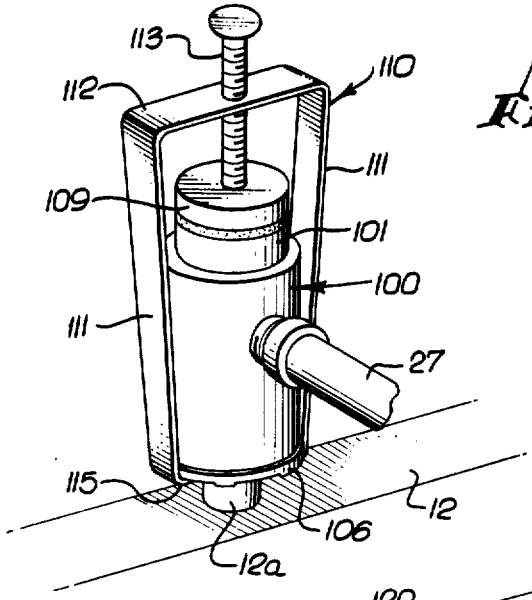
FIG. 10.
FIG. 12.
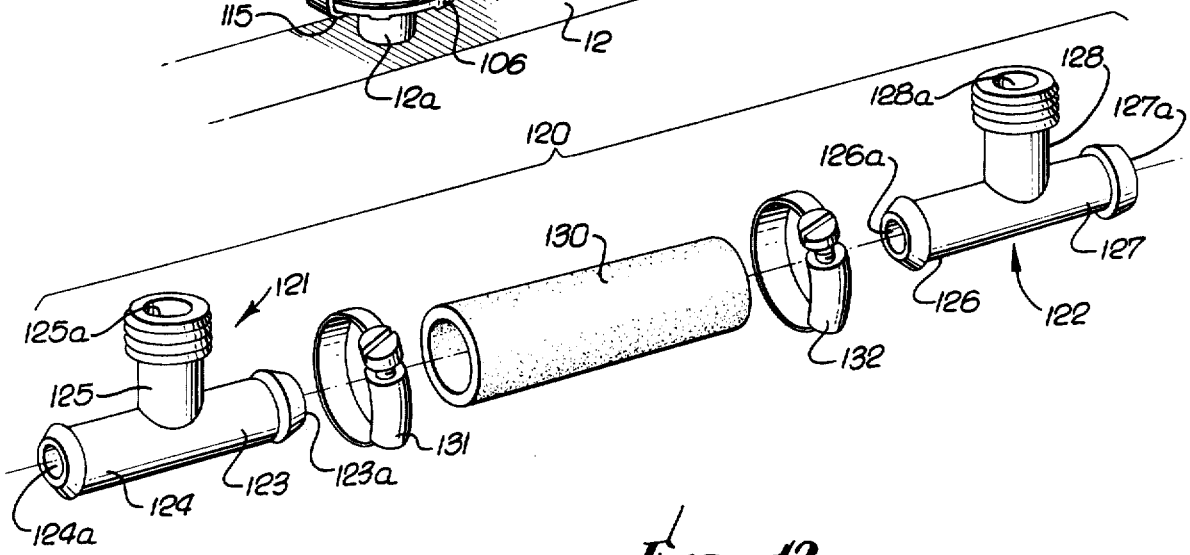
FIG. 13.
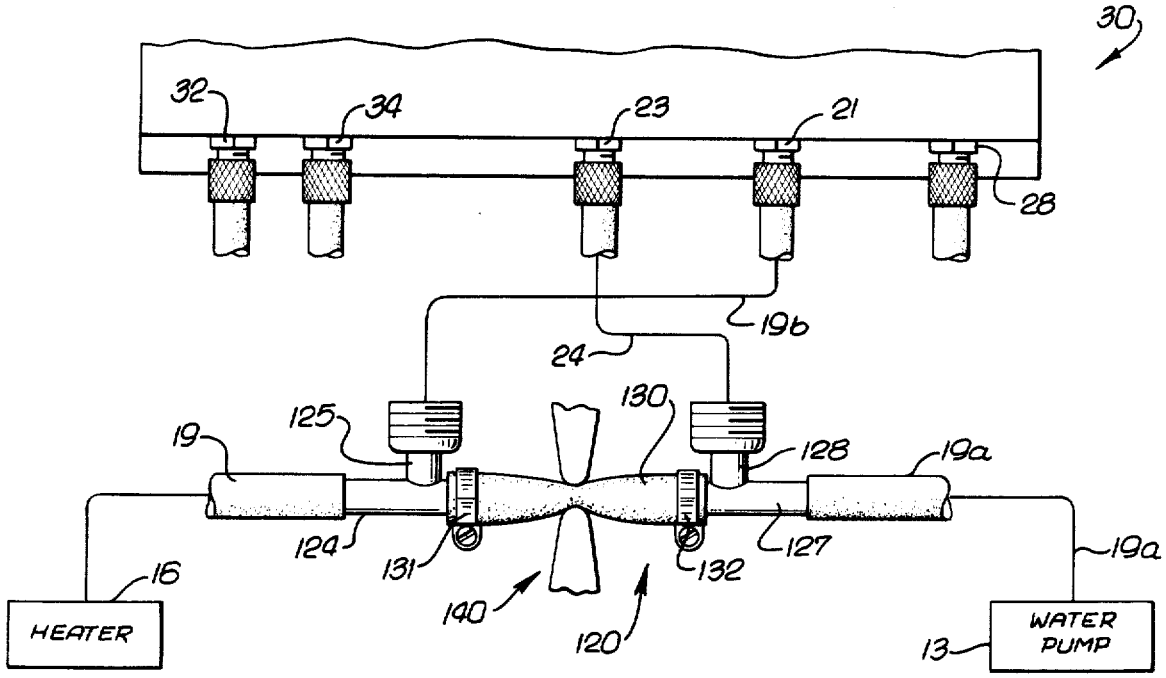

ENGINE COOLING SYSTEM FLUSHING APPARATUS AND METHOD

Matter enclosed in heavy brackets [ ] appears in the original patent but forms no part of this reissue specification; matter printed in italics indicates the additions made by reissue.

BACKGROUND OF THE INVENTION

This invention relates generally to flushing of internal combustion engine liquid cooling systems; more particularly, it concerns an air pressure assisted flushing of such systems wherein air bubbles entrained in flushing liquid act to efficiently scavenge or scrub scale and rust from coolant passages.

Studies show that over-heating is a major cause of vehicle breakdowns on highways. Engine cooling systems must operate efficiently at all times to avoid costly repairs that result from excessive temperature. In this regard, cooling systems contaminated by rust, scale build-up and sludge cannot provide adequate heat transfer and cooling system efficiency; in addition, thermostats fail to open, hoses deteriorate, impellers bind or break-off, and engine blocks can become distorted or crack. Accordingly, there is a need for efficient engine cooling system flushing methods and apparatus; however, those with which we are familiar lack the unusually advantageous combinations of structure, modes of operation and results as are now afforded by the present invention.

SUMMARY OF THE INVENTION

It is a major object of the present invention to provide flushing procedure and apparatus characterized as overcoming the problems discussed above and the disadvantages of prior flushing techniques. Basically, the invention employs the combined forces of controlled pressurized water and air turbulence to effect efficient flushing and cleaning of internal combustion engine liquid cooling systems including both the horizontal and vertical flow types. Universal hookup adaptors are provided for this purpose. The fundamental method employs steps that include:

(a) providing a controlled pressurized flow of flushing liquid and entrained gas bubbles, (b) and passing said flow alternately through (i) the radiator in a reverse direction, (ii) the engine coolant passages *and heater* in a reverse direction, (iii) the radiator in a forward direction, (iv) the engine coolant passages *and heater* in a forward direction.

As will appear, first means is provided to produce the pressurized flow of flushing liquid and entrained gas bubbles, a series of flow ports is provided as well as hookup adaptors to selectively connect to different points in the cooling system, and control means is operable to direct the flow from the first means via the ports, in the four separate modes as referred to. Such ports typically include a first port selectively connectible to the radiator; a second port selectively connectible with the heater and engine coolant passages; and a third port is selectively connectible with the coolant pump, the pump and heater normally being included in the liquid coolant system. Further, water inlet and outlet flow control valves are advantageously included for operation to establish the flow in the four different modes as referred to, the contaminated flush water flowing to a drain port in each mode. A single console may be provided to carry all of the elements, including the pressurized water and air inlet ports as well as a water and air pressure regulators and associated equipment.

A further feature of the invention concerns the provision of an air selector valve and an anti-freeze container, the valve having alternate positions in one of which air is supplied to mix with water for flushing purposes as described, one for draining the system to allow for antifreeze addition if required, and in another position air is supplied to the anti-freeze liquid container to force such liquid into the cooling system, saving time. Finally special adapters providing quick and convenient connections, are provided.

These and other objects and advantages of the invention, as well as the details of an illustrative embodiment, will be more fully understood from the following description and drawings, in which:

DRAWING DESCRIPTION

FIG. 9 is an exploded view of an adapter unit;

FIGS. 10 and 11 are perspective views showing the FIG. 9 adapter connected in different configurations to radiators;

FIG. 12 is an exploded view of another adapter; and

FIG. 13 shows the FIG. 12 adapter in use.

DETAILED DESCRIPTION

Figure 1:
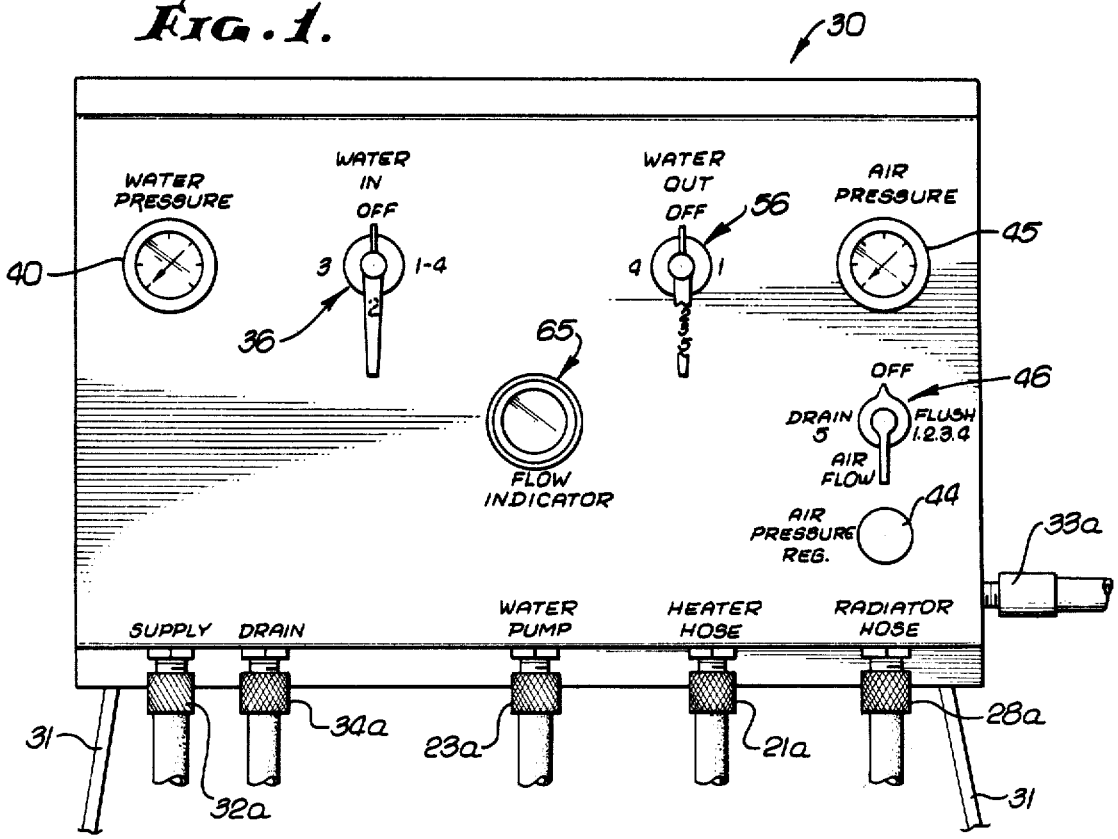
FIG. 1 is a frontal elevation of flushing apparatus for an engine cooling system.
Figure 2:
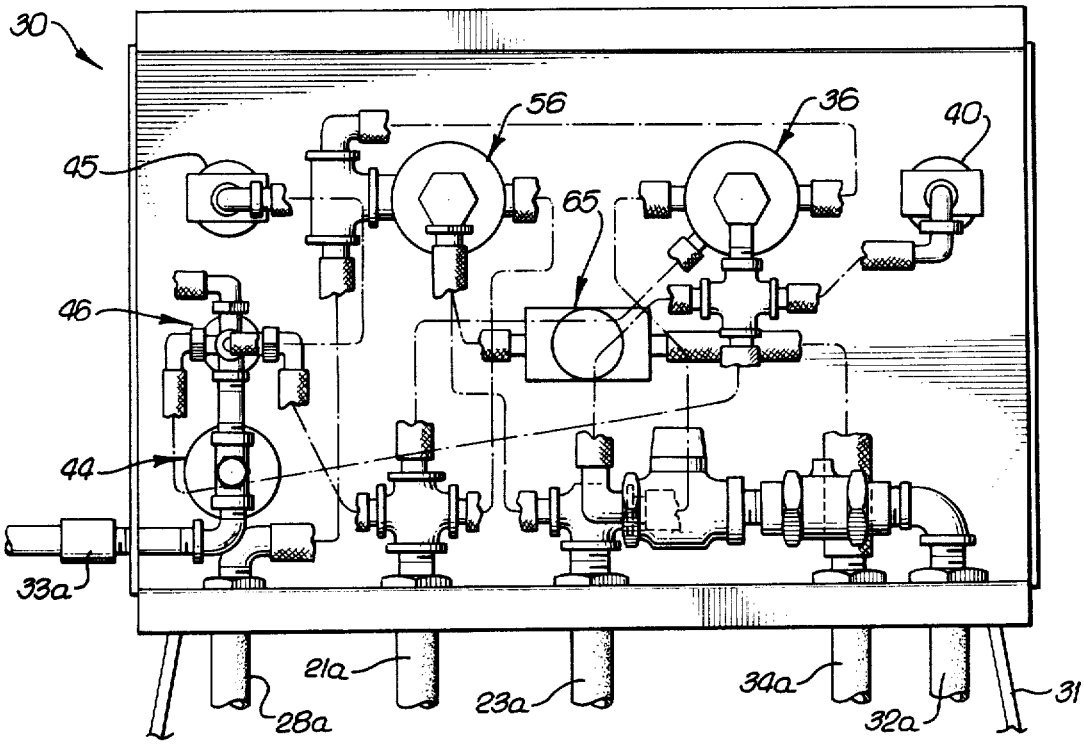
FIG. 2 is a rear view of the FIG. 1 apparatus.

In FIGS. 3–8, there are schematically shown an internal combustion engine 10 having a block 11 defining coolant passages through which liquid coolant (such as water) is adapted to pass; a radiator 12; and a coolant (i.e. water) pump 13 connected to pump coolant between the block and radiator, as via lines 14 and 15. Also shown is a heater 16 connected at 17 with the block 11 as for use in a vehicle to be heated. Normally, the water pump is connected with the heater via hoses 19 and 19a, however, the latter is shown as a broken line indicating that it is to be removed in accordance with the invention. The hose 19 is instead connected via coupling 19c with a hose 19b connected to a port 21 defined by the heater hose coupling 21a seen in FIG. 1. The water pump is then connected, (as for example at its intake) via adapter 22 and hose 24, with a port 23 defined by the water pump coupling 23a seen in FIG. 1.

The connection to the water pump is typically at its intake side.

In addition, the upper radiator hose is normally only connected at 25 with the engine block. In accordance with the invention, a three-way adapter 26 is installed in hose 25 on horizontal flow radiators, and another hose 27 connects between the adapter and a port 28 defined as by the radiator hose coupling 28a seen in FIG. 1. Hose extension 25a connects between the adapter 26 and the top of the radiator at its upper end. On vertical flow radiators, adapter 26 is installed in the radiator filler neck utilizing the adaptor modifiers provided and hose 27 connects between the adaptor and port 28, as will be later described. In that event, the hose 25 separately connects to the radiator upper interior.

In accordance with the invention, first means is provided to produce a pressurized flow of flushing liquid (such as water) and gas bubbles (such as air bubbles), and second means is connected between the first means and the cooling system to controllably feed the flow to the system, whereby the scrubbing action of the collapsing and expanding gas bubbles and flushing liquid efficiently removes scale and rust from the system during successive flushing cycles. For example, control means is provided and is typically operable to direct such flow from the first means and via the ports, in four separate modes, identified as follows:

(i) through the radiator in a reverse direction,
(ii) through the engine coolant passages in a reverse direction,
(iii) through the radiator in a forward direction,
(iv) through the engine coolant passages in a forward direction.

Such modes are typically shown in FIGS. 3–6, respectively, and as will be further described. They ensure that rust and scale removed from either one of the radiator, heater or engine does not clog or remain in the other during flushing.

A console is typically provided as at 30 to carry the first means, ports and control means, and may be suitably supported as by legs 31 so that the console is at best working level relative to the engine and radiator, as on a vehicle. In addition to the first port (such as defined at 28 by coupling 28a) selectively connected to the radiator, the second port (such as defined at 21 by coupling 21a) selectively connected with the heater, and the third port (such as defined at 23 by coupling 23a). The console may also carry a fourth port 32 defined by coupling 32a, a fifth port 33 defined by coupling 33a, and a drain port 34 defining by coupling 34a.

The first means to produce the pressurized flow of flushing liquid and entrained gas bubbles may be considered to include the water inlet port 32, the gas or air inlet port 33, and certain ducting. The latter is connected between such ports and an inlet port 35 defined by a primary valve 36. Such ducting is shown to include, for example, water supply ducts 37a–37d with elements 38, 39 and 40 connected in series therewith. Such elements include a water pressure regulator which is adjustable at 38a, an anti-back flow valve 39, and a water pressure gage 40. The ducting also includes, for example, pressurized air supply ducts 41a–43a with elements 44–46 connected in series therewith. The latter elements include an air pressure regulator 44, adjustable at 44a, air pressure gage 45, and air selector valve 46. With the valve in the position shown in FIGS. 3–6, air flows to mix at 48 with water, at the same adjustably regulated pressure, and flow at 49 to the inlet 35. One typical regulator 38 is Type E-41 produced by A. W. Cash Valve Mfg. Corp., Decatur, Illinois. One typical regulator 44 is Type R04 produced by C. A. Norgren Co., Littleton, Colorado.

The control means may be considered to include primary valve 36 (water inlet valve) which has three outlets 50, 51 and 52 respectively connected with the first, second and third ports 28, 23 and 21, as via lines 53–55. In addition, the control means may advantageously include a secondary valve 56 having three inlets 57–59 also respectively connected with the first, second and third ports as via lines 60–62. Valve 56 also has a discharge port 63 connected via line 64, flow indicator 65 and line 66 with drain port 34. Indicator 65 may include a sight glass, with a vaned rotor that is turned by the flow.

In operation, the valves 36 and 56 are both turned to "1" position in FIG. 1 (corresponding to the arrow indicated flow path of FIG. 3) and the air selector valve is turned to "FLUSH" position, to supply air to the water inlet flow. As the radiator is flushed in a reverse direction, the sight glass at 65 may be observed to note flow of scale and other particles toward the drain. After the flow at 65 becomes clear, the valves 36 and 56 are turned to "2" position in FIG. 1 (corresponding to the arrow indicated flow path of FIG. 4) and the sight glass again observed. After the flow becomes clear, the valves 36 and 56 are turned to "3" position in FIG. 1 (corresponding to the arrow indicated flow path of FIG. 5) and the sight glass again observed; after the flow becomes clear, the valves 36 and 56 are turned to "4" position in FIG. 1 (corresponding to the arrow indicated flow path of FIG. 6). Finally, after the flow becomes clear, the valves are toward the OFF position. The hoses 24, 19b and 27 are then disconnected, the adapters 22, 26 are disconnected, the coupling 19c is removed, the hose 19 is connected to the water pump 13 at 19a, and the vehicle is then ready for drive away. Anti-freeze may be added, if required. To evacuate the system of water then necessary as, and if required on specific systems referring to FIG. 7, valves 36 and 56 are respectively turned to positions "OFF" and "3". Valve 46 is then turned to drain (position 5) and the air regulator 44 is adjusted to pressurize the system, forcing the water out through hose 19, heater 16, engine block 11, water pump 13 as illustrated.

Figure 7:
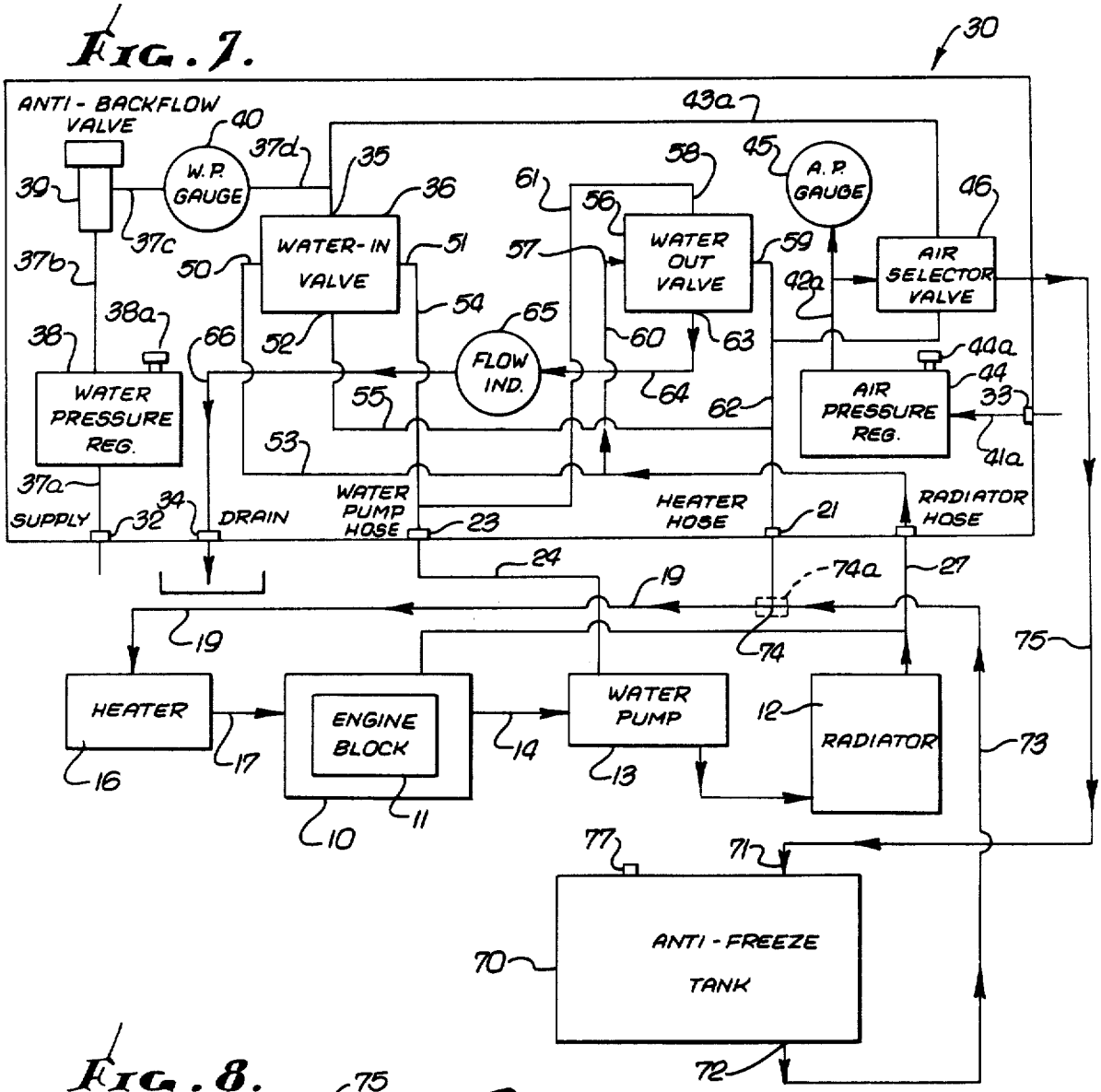
FIG. 7 is a flow diagram showing operation during [the cooling system drain cycle, which may be used as needed in certain vehicles to allow for] the addition of [the optimum amount of] antifreeze.
Figure 8:
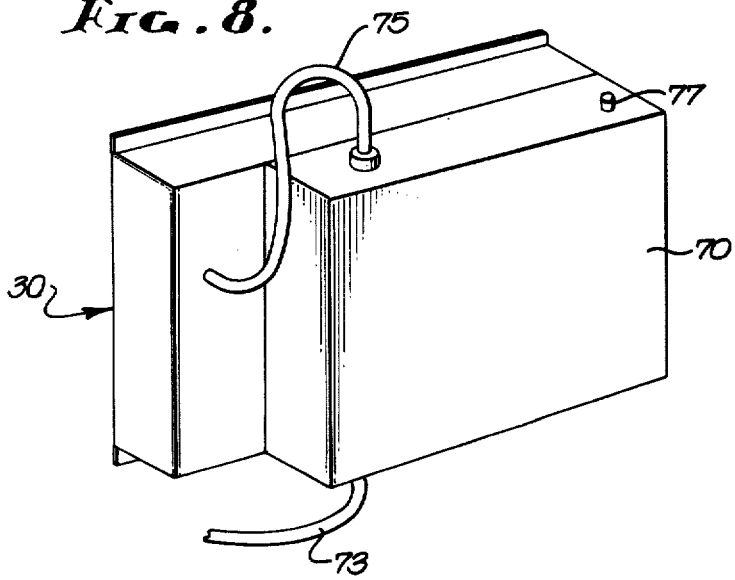
FIG. 8 is a perspective view showing an anti-freeze supply tank associated with the FIG. 1 and FIG. 2 apparatus.

Referring to FIGS. 7 and 8, the invention enables use of supplied air pressure to displace anti-freeze into the coolant system. For this purpose, an anti-freeze liquid container 70 may have an inlet 71 selectively connected with air inlet port as via the selector valve 46. The container bottom outlet 72 is connected with the coolant system, as for example by hose 73 connected with hose 19 at point 74, a suitable adapter 74a being provided. When the valve is turned to "FILL" position as seen in FIG. 1, the air flow in FIG. 8 proceeds via line 75 to displace anti-freeze from the tank 70. The liquid flows at 73 and 19 into the system via the heater, displacing water from the heater 16, engine block 10, and radiator, through the secondary valve, and to the drain along the path indicated by the arrows. Valve 36 is in OFF position, and valve 56 in position "5" in FIG. 1, at this time. When tank 70 is empty, the valve 46 may be returned to OFF position in FIG. 1. A relief valve 77 is installed on the tank to relieve air pressure over about 5 psi.

Referring now to FIG. 9, the three-way adapter assembly 26 there shown comprises a tubular body 100 having reduced diameter ends 101 and 102 defining end openings 101a and 102a (not shown), and a side opening 103 which may be internally threaded at 103a. One of the body ends, as for example at 102, is sized for direct connection to the radiator filler neck 12a in registration with the port 104 formed by that neck. A gasket 105 typically seals off between the body and the neck, internally of the latter. Side opening 103 is connectible in series with a hose such as hose 27 in FIG. 3 (hose 25 in that event separately connects to the radiator).

Means is provided to close the other of the body end openings (such as end opening 101a). Such means advantageously includes a cap 109, and a clamp holding the cap against and over the end 101. The clamp advantageously includes a bail 110 having two legs 111 and a cross-piece 112 extending over the cap (see FIG. 10). An adjustable stem 113 has threaded interengagement with the bail cross-piece at 114, and extends toward and against the cap to retain the cap tightly against the end 101, closing the opening 101a. Bail legs 111 have turned ends 115 gripping the underside of the radiator neck bead 106 (see FIG. 10) to retain the cap 109 against displacement off the end 101.

In the alternate position of the adapter, seen in FIG. 11, the end 101 has hose 25 connected thereto (as by a suitable clamp), and the body 100 extends horizontally. Note that the body end 102 is connected to the radiator hose port which opens laterally instead of vertically, that port appears at 300.

Referring now to FIG. 12, the special adapter assembly 120 there shown includes two tees 121 and 122 each having three legs 123–125 and 126–128, defining three outlets 123a to 125a and 126a–128a. A flexible, pinch-off hose 130 interconnects legs 123 and 126, as via clamps 131 and 132.

Figure 3:
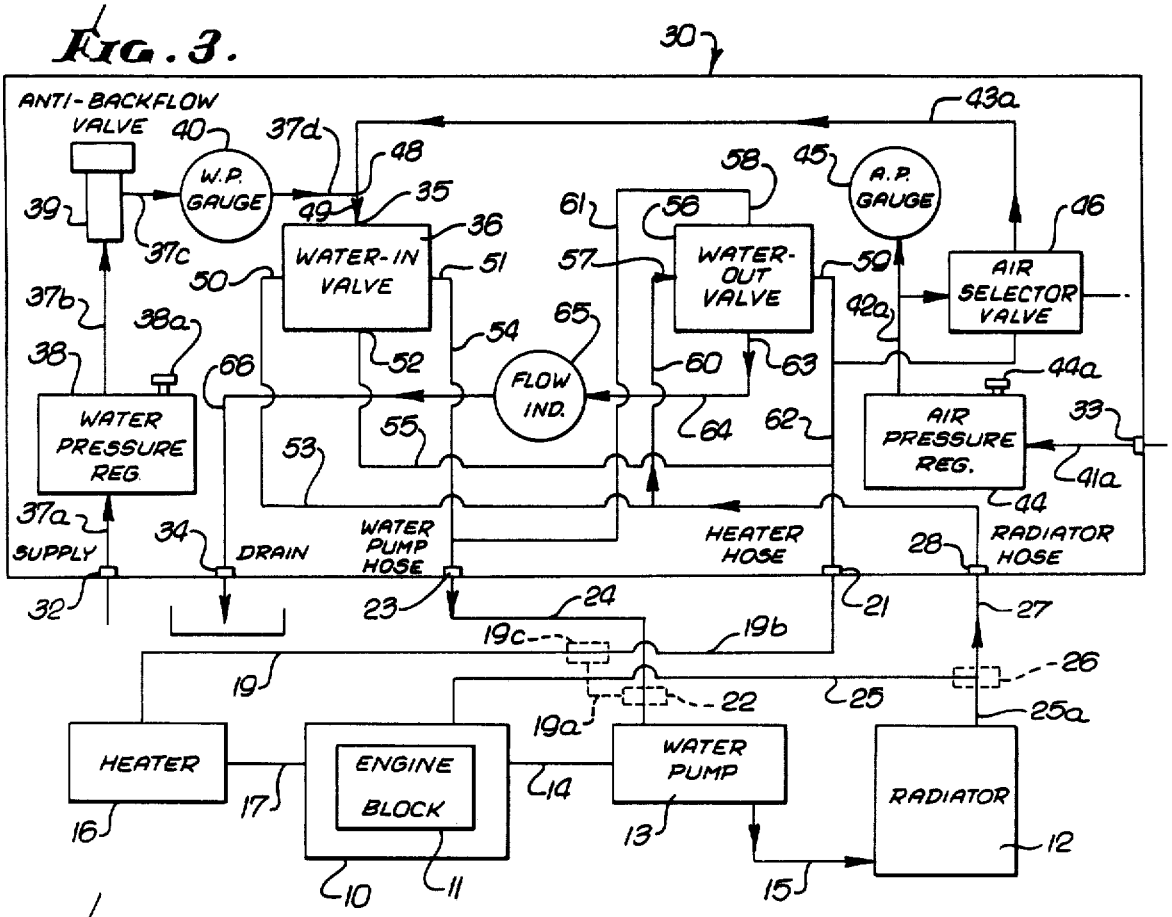
FIG. 3 is a flow diagram showing operation of the apparatus during a reverse flush through the radiator core.
Figure 4:
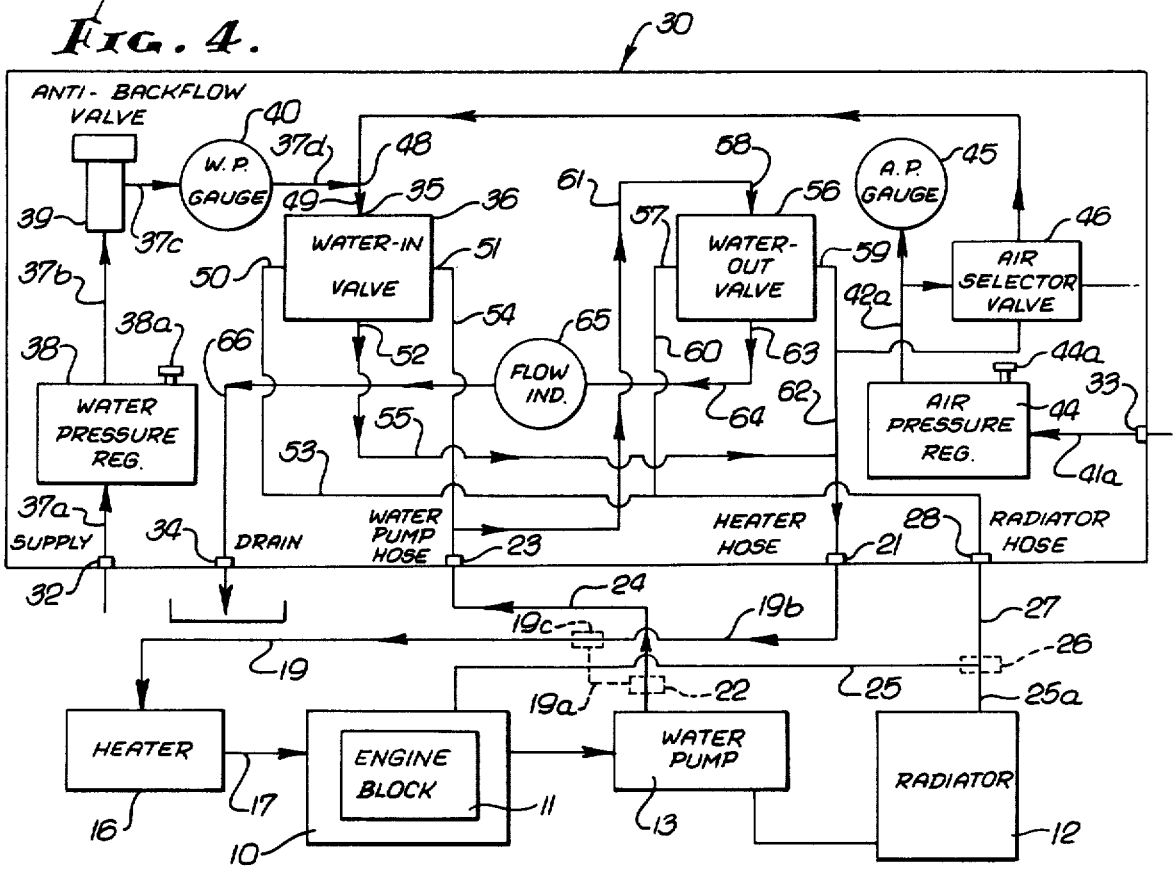
FIG. 4 is a flow diagram showing operation of the apparatus during a reverse flush through the heater core, engine block and water pump.
Figure 5:
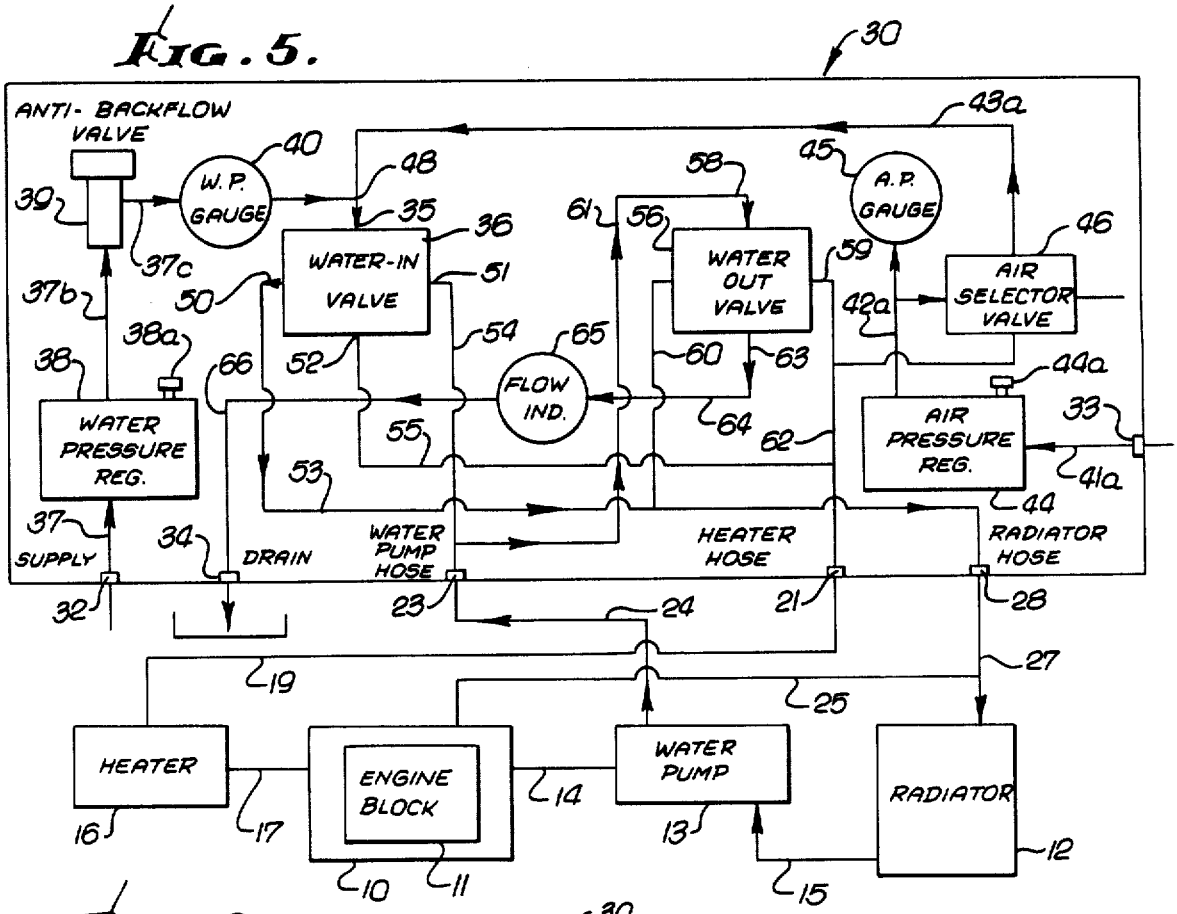
FIG. 5 is a flow diagram showing operation during a normal flush through the radiator core and water pump.
Figure 6:
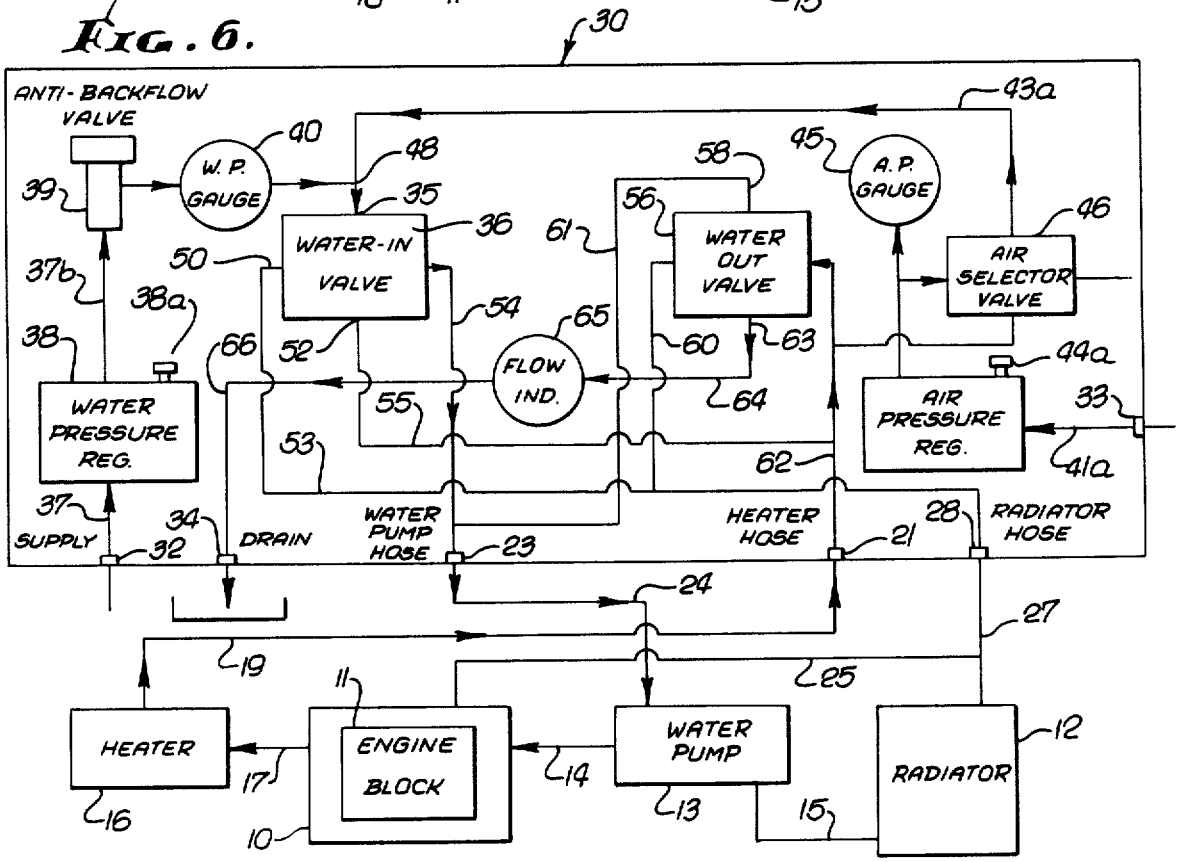
FIG. 6 is a flow diagram showing operation during a normal flush through the engine block and heater core.

Referring now to FIG. 13 showing the installed condition, heater hose 19 and 19c is cut, and the ends thereof connected to tee legs 124 and 127, as shown. Also, hoses 24 and 19b are connected to tee legs 125 and 128, as shown. Finally, a clamp 140 is provided to pinch off hose 130. As a result, the final connections are as appears in FIG. 3. The adapter 120, accordingly, provides a very quick and convenient means to establish certain connections involving the heater hose, as seen in FIG. 3. After the flush procedure is completed, the heater hoses 19 and 19c are removed from the adapter 120, and re-joined by appropriate means.

Tank or container 70 may be mounted at the back side of the console 30, as indicated in FIG. 8. Tank 70 preferably consists of plastic.

*Referring again to FIG. 4, evacuation of the cooling system may be achieved by turning water-in valve 36 (primary valve) to "OFF" position (thereby providing no fresh water flow to the cooling system), and by turning the air selector valve 46 to "DRAIN" position. Under these conditions, air flows from valve 46 to line 62, to line 19b and to the heater. Concurrently, there is no flow from valve 46 to line 43a, or from valve 36 to line 55.*

We claim:

[1. For combination with an internal combustion engine cooling system that includes a liquid coolant heat radiator and a liquid coolant pump, flushing apparatus comprising:

(a) first means to produce a pressurized flow of flushing liquid and entrained gas bubbles, (b) a series of flow ports selectively connectible to different points in said system, utilizing appropriate adaptors and (c) control means operable to direct said flow from said first means and via said ports in four separate modes, identified as follows:

(i) through the radiator in a reverse direction, (ii) through the engine coolant passages in a reverse direction, (iii) through the radiator in a forward direction, (iv) through the engine coolant passages in a forward direction.]

2. The apparatus of claim [1] *19* including a console carrying said first means, ports and control means.

3. The apparatus of claim [1] *2* wherein said [system includes a vehicle heater having a coolant passage connected with engine coolant passage, and a coolant pump connected with the radiator, said ports include a first port selectively connectible to the radiator, a second port selectively connectible with the heater coolant passage, and a third port selectively connectible with the coolant pump] *first, second and third ports are located along the lower portion of said console.*

4. The apparatus of claim [3] *19* including said engine cooling system, and including hoses connecting said first, second and third ports with the radiator, heater and pump, respectively.

[5. The apparatus of claim 3 wherein said control means includes a primary valve connected to receive said flow in the form of pressurized water and air bubbles, said valve having three outlets respectively connected with said first, second and third ports.]

[6. The apparatus of claim 5 including a drain port, and a said control means includes a secondary valve having three inlets respectively connected with said first, second and third ports, said second valve having a discharge port connected with the drain port.]

7. The apparatus of claim [6] *19* including a console carrying said first means, ports and control means.

8. The apparatus of claim 7 wherein said first means includes a pressurized water inlet port, a pressurized air inlet port, and ducting connected between said air and water inlet ports and an inlet port defined by said primary valve.

9. The apparatus of claim 8 wherein said ducting includes water supply ducting, and a water pressure regulator connected in series therewith.

10. The apparatus of claim 9 wherein said ducting includes air supply ducting, and an air pressure regulator connected in series therewith.

11. The apparatus of claim 10 including means to adjust the regulated pressures of said regulators.

12. The apparatus of claim [11] *14* including an air selector valve via which the air inlet port is selectively connected with the supply liquid or the anti-freeze liquid container inlet.

13. The apparatus of claim [11] *14* including a console carrying said first means, said ports and said control means, the anti-freeze container attached to said console.

14. The apparatus of claim ]1] *19* wherein said first means includes a pressurized water inlet port, and a pressurized air inlet port, and including an anti-freeze liquid container having an inlet selectively connected with said pressurized air inlet port, and an outlet connected with said system.

15. The apparatus of claim [14] *12* wherein the air selector valve has an alternate position in which the air inlet port is connected directly via one of said ports with said coolant system.

[16. In combination with a vehicle internal combustion engine cooling system that includes a liquid coolant heat radiator, and liquid coolant pump, flushing apparatus comprising (a) first means to combine a pressurized stream of air and a pressurized stream of water to produce a pressurized water flow containing air bubbles, and (b) second means connected between said first means and said system to controllably and selectively feed said flow to at least three different points of said system.]

[17. The method of flushing an internal combustion engine liquid cooling system, the system including a liquid coolant heat radiator and the engine having cooling passages, said method including (a) providing a controlled pressurized flow of flushing liquid and entrained gas bubbles, (b) and passing said flow alternately through (i) the radiator in a reverse direction, independently of the engine coolant passages, (ii) the engine coolant passages in a reverse direction, independently of the radiator, (iii) the radiator in a forward direction, independently of the engine coolant passages, (iv) the engine coolant passages in a forward direction, independently of the radiator.]

[18. The method of claim 17 including also passing the flow forwardly and reversely through a coolant pump and a heater, both of which are connected to said system.]

*19. For combination with an internal combustion engine cooling system that includes a liquid coolant heat radiator and a liquid coolant pump connected with coolant passages of an engine, and a heater having a liquid coolant passage*

*connected with the engine coolant passages, flushing apparatus comprising:*

*(a) first means to produce a pressurized flow of flushing liquid and entrained gas bubbles,*

*(b) a series of flow ports selectively connectible to different points in said system, utilizing appropriate adaptors, the series including a first port selectively connectible to the radiator, a second port selectively connectible to the heater, and a third port selectively connectible to the coolant pump, and*

*(c) control means operable to direct said flow from said first means and via said ports in four separate modes, identified as follows:*

*(i) through the radiator in a reverse direction,*

*(ii) through the engine coolant passages in a reverse direction,*

*(iii) through the radiator in a forward direction,*

*(iv) through the engine coolant passages in a forward direction,*

*flow also passing through the heater in some of said modes, and*

*(d) said control means including a primary valve connected to receive said flow in the form of pressurized liquid and air bubbles, said valve having three outlets respectively connected with said first, second and third ports, there being a drain port, and said control means also including a secondary valve having three inlets respectively connected with said first, second and third ports, said secondary valve having a discharge port connected with the drain port, operation of said primary and secondary valves characterized as controlling said flow in said four separate modes.*

* * * * *